Oct. 17, 1944.  A. S. HOWELL  2,360,422
TORQUE EQUALIZING DEVICE
Filed May 8, 1943  3 Sheets-Sheet 1
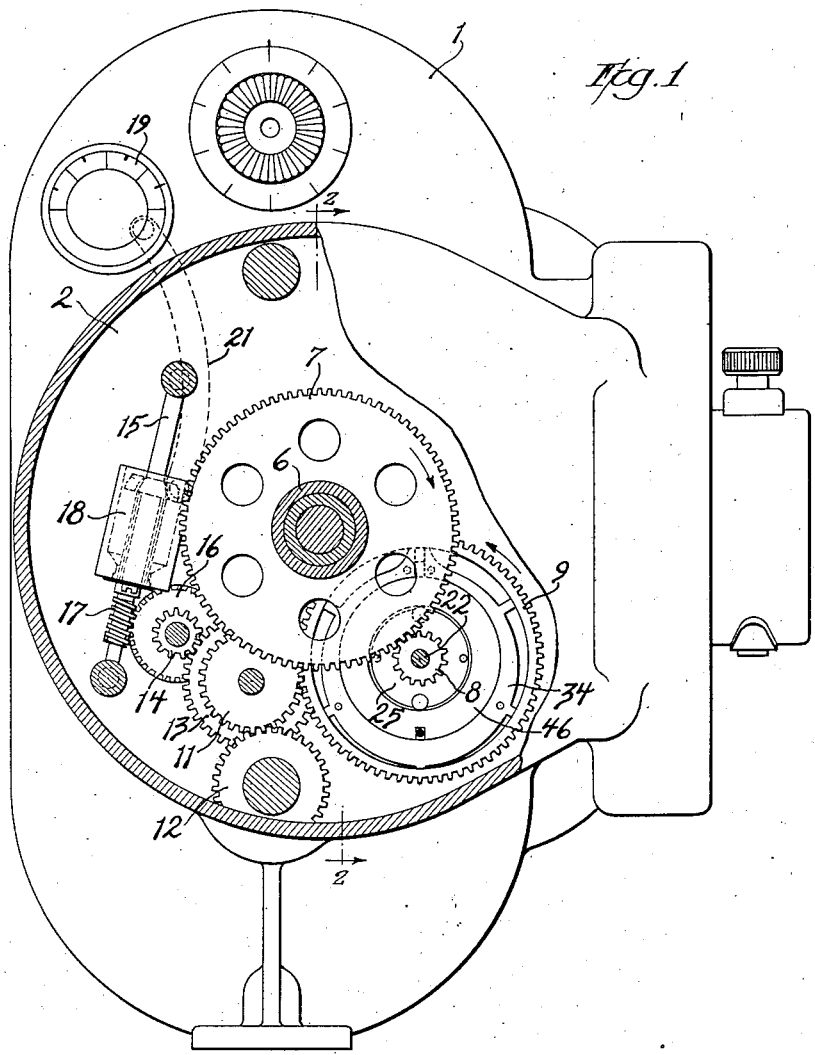
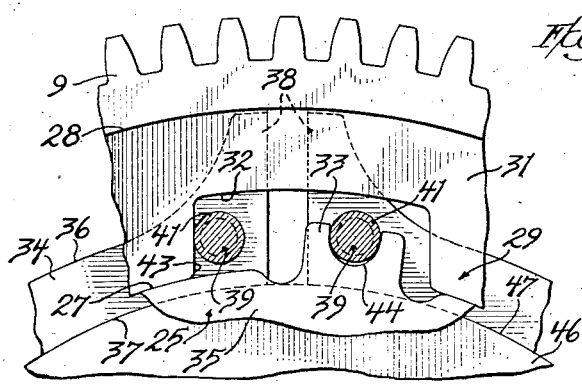
Inventor
Albert S. Howell
By Robert H. Miehle
Atty.

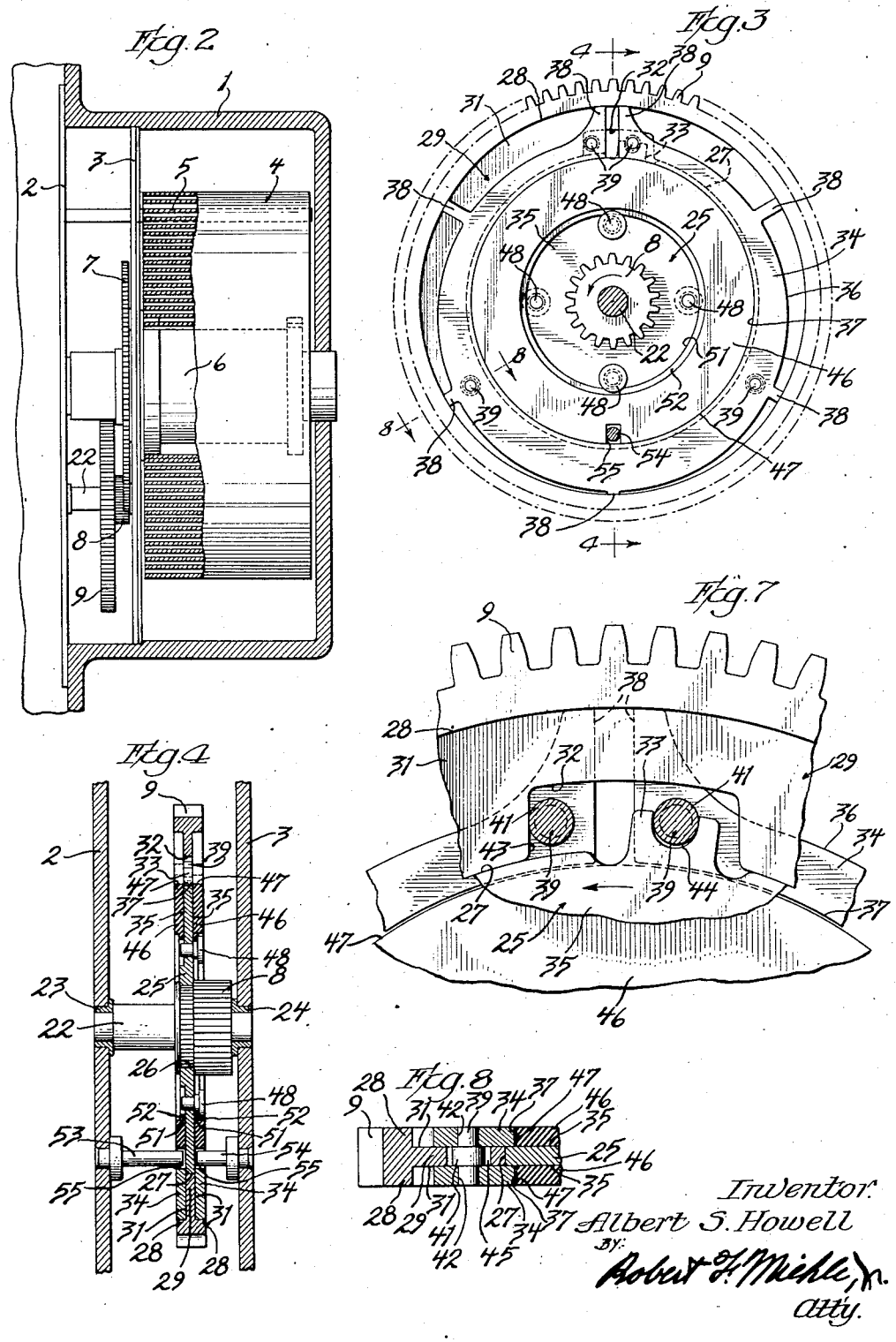

Oct. 17, 1944.  A. S. HOWELL  2,360,422
TORQUE EQUALIZING DEVICE
Filed May 8, 1943  3 Sheets-Sheet 3

Inventor
Albert S. Howell
BY
Robert F. Miehle Jr.
Atty.

Patented Oct. 17, 1944

2,360,422

UNITED STATES PATENT OFFICE 2,360,422

TORQUE EQUALIZING DEVICE

Albert S. Howell, Culver, Ind., assignor to The Bell & Howell Company, Chicago, Ill., a corporation of Illinois Application May 8, 1943, Serial No. 486,182

9 Claims. (Cl. 192—7)

My invention relates particularly to torque equalizing devices for governor controlled spring driven mechanisms such as are employed in spring driven motion picture cameras.

The general object of the invention resides in the provision of a novel and effective torque equalizing device which is particularly adapted for incorporation in a spring driven multiplying gear transmission train and particularly in a governor controlled transmission train of a motion picture camera, having in mind compactness, unitary structure and convenient incorporation in transmission trains of existing design without undue alteration.

The invention will be better understood by reference to the accompanying drawings in which—

Figure 1 is a side elevational view, partially in section, of a motion picture camera embodying the torque equalizing device of my invention;

Figure 2 is a partial sectional view substantially on the line 2—2 of Figure 1;

Figure 3 is an axial elevational view of the torque equalizing device with parts in section;

Figure 4 is a partial section substantially on the line 4—4 of Figure 3;

Figures 6 and 7 are partial views in elevation similar to Figure 3 with parts omitted and with parts in section and showing parts in different positions; and Figure 8 is a partial section substantially on the line 8—8 of Figure 3.

Figure 5:
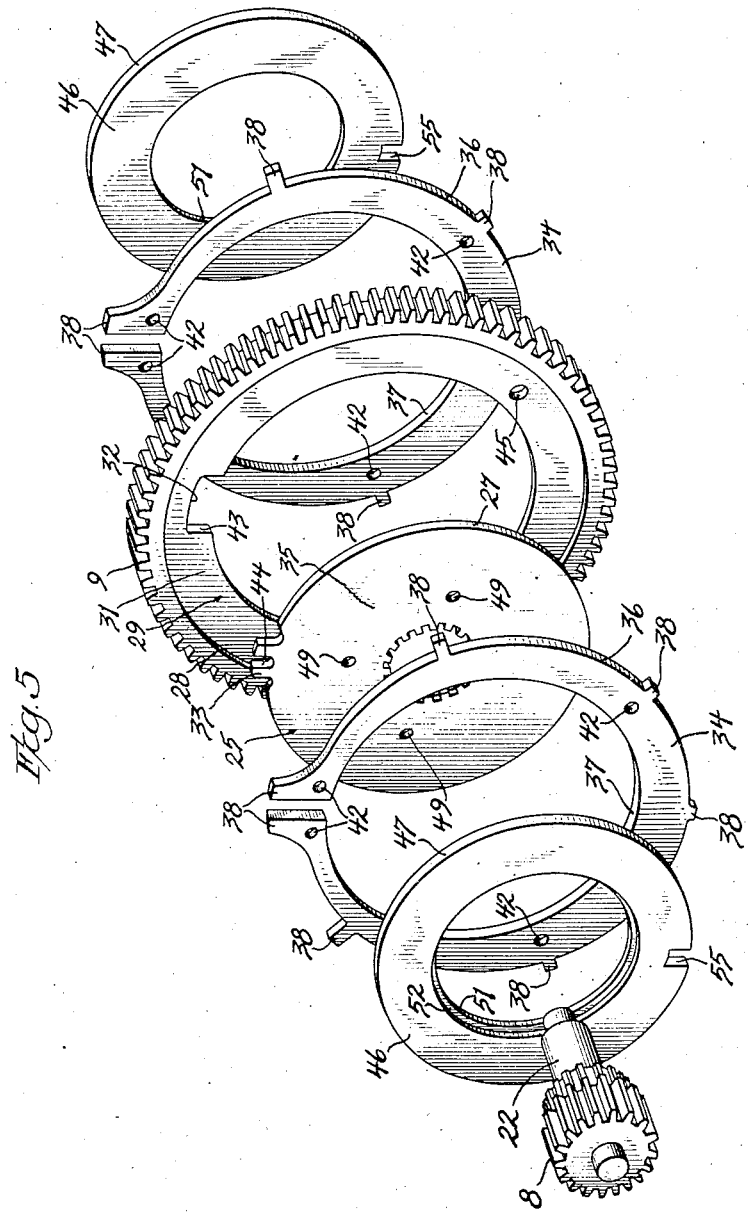
Figure 5 is a perspective view of the main parts of the torque equalizing device showing them in axially spaced relation.

Referring to the drawings, 1 designates a motion picture camera casing within which is secured a mechanism frame comprising frame plates 2 and 3, secured in spaced parallel relation. See Figures 1, 2 and 4. A spring motor, generally designated at 4, is disposed within the casing and includes a power spring 5 having the inner end thereof secured with a rotatable hub 6 for driving the same, the spring being manually wound from the exterior of the casing in a manner unnecessary to be described. The hub 6 extends between the frame plates 2 and 3 and is rotatably mounted thereon in a usual manner.

A multiplying gear transmission train driven by the spring motor is disposed between the frame plates 2 and 3 and serves to drive the camera mechanism, not shown, from the motor and this transmission train consists as follows:

Referring particularly to Figure 1, a primary drive spur gear 7 is secured on the driving hub 6 of the spring motor for rotation therewith and meshes with a rotatable spur gear pinion 8. A rotatable spur gear 9, coaxial with the pinion 8 and connected to be driven therefrom by my torque equalizing device hereinafter described, meshes with a rotatable spur gear 11 which meshes with a rotatable film takeup spindle spur gear 12. A rotatable spur gear 13 is secured in coaxial relation with the gear 11 and meshes with a rotatable spur pinion 14 from which the mechanism of the camera, not shown, is driven.

A rotatable governor shaft 15 is carried on the frame plate 2 and is driven from the pinion 14 by means of a rotatable spiral gear 16 secured in coaxial relation with the pinion 14 and meshing with a spiral gear pinion 17 fixed on the governor shaft. The governor shaft drives an adjustable centrifugal speed governor, generally designated at 18, for effecting uniform operating speeds of the gear train and the mechanism driven thereby, and the governor is adjusted for different uniform speeds from the exterior of the camera by means of a calibrated dial 19 operatively connected with the governor by means of a link 21.

The gear pinion 8, which meshes with the primary drive gear 7 and is driven thereby, is fixed on a rotatable shaft 22 extending across between the frame plates 2 and 3 and rotatably mounted thereon by means of bearings 23 and 24, as shown in Figure 4. An axially bored circular disk 25 is secured, as designated at 26, with the shaft 22 and with the gear pinion 8 for axial rotation therewith, and the major portion of the periphery of the disk provides an external radially facing surface of revolution 27 thereon. See Figures 4 to 8.

The gear 9 is in the form of a ring gear having a stepped axial bore forming outer large bore portions 28 and a small bore portion 29 therebetween and oppositely facing axially facing shoulders 31 between said bore portions, and the surface 27 of the disk 25 is rotatively engaged in the small bore portion 29 of the ring gear for relative angular movement of the ring gear and disk, the ring gear being thus carried by the disk and the ring gear and disk being coaxially rotatable. The small bore portion 29 of the ring gear is provided with a recess 32 open at the bore thereof and at the shoulders 31, and the disk 25 is provided with a radial projection 33 extending into the recess 32, the angular extent of the projection being less than that of the recess so that the ring gear and disk are relatively angularly movable.

Two resilient split rings 34 are disposed on opposite sides of the disk 25 and ring gear 9 and respectively within the large bore portions 28 of the ring gear in axial correspondence therewith and are axially engageable with the shoulders 31 and correspondingly engageable with the axial faces 35 of the disk. The resilient rings 34 are radially flexible and their external radially facing surfaces 36 are disposed eccentrically of their internal radially facing surfaces 37 in such relation that they increase in radial thickness from their ends toward the intermediate portions thereof to equalize their radial flexure angularly thereabout. The rings 34 are provided with lugs 38 spaced angularly thereabout and projecting radially outward therefrom and having their outer ends equidistant from the internal surfaces 37 and engageable with the surfaces of the large bore portions 28 of the ring gear 9 to position the rings 34 with the internal surfaces 37 concentric with the ring gear 9 and disk 25, as best shown in Figure 3.

Studs 39 provided with intermediate enlarged spacing portions 41, as best shown in Figure 8, are spaced angularly about the resilient rings 34 and, extending across between these rings, have their ends engaged with press fits in apertures 42 respectively through these rings, see also Figures 3 and 5, to secure these rings in axially spaced relation and thus to axially position each ring in the direction away from the corresponding shoulder 31 of the ring gear 9 and to axially position the ring gear with respect to the disk 25 by reason of the rings 34 axially engaging the shoulders 31 and correspondingly engaging the axial faces 35 of the disk.

Two of the studs 39 extend through the recess 32 of the ring gear 9, as best shown in Figures 6 and 7, and are secured respectively with corresponding ends of the rings 34, and one of these studs engages a radial side 43 of the recess to angularly connect corresponding ends of these rings with the ring gear 9, and the other of these studs engages in a radial slot 44 through the radial projection 33 of the disk 25 to angularly connect the other corresponding ends of the rings 34 with the disk. The remainder of the studs 39 extend through relatively large apertures 45 through the small bore portion of the ring gear 9 and serve merely to secure the rings 34 in axially spaced relation. See particularly Figure 8.

And so connected with the disk 25 and the ring gear 9, the rings 34 form a resilient driving connection therebetween and these rings are radially flexible responsive to torque between the disk and ring gear. Accordingly, as the disk 25, which constitutes the driving member of the device, is rotated in the direction of the arrow in Figure 7, it drives the ring gear 9, which constitutes the driven member of the device, in the corresponding direction through the rings 34. Assuming that there is little or no torque between the disk 25 and the ring gear 9, the rings 34 remain in their normal radially expanded condition as shown in Figure 7. However, as the torque between the disk 25 and the ring gear increases, the rings 34 are radially flexed in the contracting direction responsive to this torque with consequent contraction of the internal surfaces 37, as shown in Figure 6.

Concentrically bored brake rings 46 are disposed on opposite sides of the disk 25 and have their external radially facing surfaces 47 frictionally engageable by the internal surfaces 37 of the rings 34, and shouldered and headed studs 48, angularly spaced about the axis of the disk 25 and press fitted into apertures 49 through the disk, engage the bores 51 of the brake rings and axially facing shoulders 52 of these bores and thus carry the brake rings for rotation with respect to the disk, as best shown in Figures 3 and 4. Stationary studs 53 and 54 are respectively secured on the frame plates 2 and 3 and respectively engage radial slots 55 of the brake rings 46 to hold the same against rotation.

As the resilient rings 34 are radially flexed in the contracting direction responsive to the torque between the driving disk 25 and the driven ring gear 9, as hereinbefore described, the internal surfaces 37 of the rings 34 are contracted into frictional engagement with the external surfaces 47 of the brake rings 46 with a pressure varying with the amount of said torque, thus equalizing the torque exerted by the ring gear 9. Thus, while the energy of the power spring 5 gradually diminishes as it unwinds in driving the gear transmission train and mechanism of the camera, the equalizing device equalizes the torque exerted by the ring gear 9, so that the speed governor 18 is not subject to variances in torque incident to diminishing energy of the power spring and is consequently more effective in maintaining a uniform speed of the camera mechanism.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination of coaxial rotatable driving and driven members, driving means operative between said driving and driven members comprising a resilient split ring disposed in axial correspondence and having its ends respectively connected therewith and being radially flexible responsive to torque therebetween, said ring increasing in thickness from its ends toward the intermediate portion thereof, and a brake member having a radially facing surface of revolution frictionally engageable by said ring responsive to flexure thereof to equalize the torque exerted by said driven member.

2. In a device of the character described the combination of coaxial-rotatable driving and driven members one of which is provided with an axial bore, driving means operative between said driving and driven members comprising a resilient split ring disposed within said bore in axial correspondence and having its ends respectively connected with said driving and driven members and being radially flexible responsive to torque therebetween, said ring increasing in radial thickness from its ends toward the intermediate portion thereof and provided with lugs spaced angularly thereabout and projecting radially outward therefrom and having their outer ends equidistant from the internal radially facing surface of the ring and engageable with the surface of said bore, and a stationary brake member having an external radially facing surface of revolution frictionally engageable by said internal surface of said ring responsive to flexure of said ring to equalize the torque exerted by said driven member.

3. In a device of the character described, the combination of coaxial rotatable driving and driven members a first of which is provided with an axial bore and the second of which is provided with an external radially facing surface of revolution rotatively engaged in said bore for relative angular movement of said members, driving means operative between said driving and driven members comprising a curved resilient member disposed in axial correspondence and connected at spaced points therealong respectively therewith and being radially flexible responsive to torque therebetween, and a stationary brake member having a radially facing surface of revolution engageable by said resilient member responsive to flexure thereof to equalize the torque exerted by said driven member.

4. In a device of the character described, the combination of coaxial rotatable driving and driven members a first of which is provided with an axial bore and the second of which is provided with an external radially facing surface of revolution rotatively engaged in said bore for relative angular movement of said members, driving means operative between said driving and driven members comprising a resilient split ring disposed within said bore in axial correspondence and having its ends respectively connected with said driving and driven members and being radially flexible responsive to torque therebetween, a brake member having an external radially facing surface of revolution frictionally engageable by the internal radially facing surface of said ring responsive to flexure of said ring and carried by said second member for rotation with respect thereto, and stationary means engaging said brake member and holding the same against rotation.

5. In a device of the character described, the combination of coaxial rotatable driving and driven members a first of which is provided with a stepped axial bore forming large and small bore portions and an axially facing shoulder therebetween and said small bore portion being provided with a recess open at the bore thereof and at said shoulder and the second of which members is provided with an external radially facing surface of revolution rotatively engaged in the bore of said small bore portion for relative angular movement of said members and provided with a radial projection extending into said recess, driving means operative between said driving and driven members comprising a resilient split ring disposed within said large bore portion in axial correspondence with said driving and driven members and engageable against said shoulder and provided at its ends with projections extending into said recess and respectively angularly engaging a radial side of said recess and said first mentioned projection to drivingly connect the ends of said resilient member respectively with said driving and driven members and said ring being radially flexible responsive to torque between said driving and driven members, positioning means axially positioning said ring in the direction away from said shoulder, and a stationary brake member having an external radially facing surface of revolution frictionally engageable by the internal radially facing surface of said ring responsive to flexure of said ring to equalize the torque exerted by said driven member.

6. In a device of the character described, the combination of coaxial rotatable driving and driven members a first of which is provided with a stepped axial bore forming large and small bore portions and an axially facing shoulder therebetween and said small bore portion being provided with a recess open at the bore thereof and at said shoulder and the second of which members is provided with an external radially facing surface of revolution rotatively engaged in the bore of said small bore portion for relative angular movement of said members and provided with a radial projection extending into said recess, driving means operative between said driving and driven members comprising a resilient split ring disposed within said large bore portion in axial correspondence with said driving and driven members and axially engageable against said shoulder and correspondingly engageable with said second member axially thereof and provided at its ends with projections extending into said recess and respectively angularly engaging a radial side of said recess and said first mentioned projection to drivingly connect the ends of said ring respectively with said driving and driven members, said ring being radially flexible responsive to torque between said driving and driven members and increasing in radial thickness from its ends toward the intermediate portion thereof and provided with lugs spaced angularly therabout and projecting radially outward therefrom and having their outer ends equidistant from the internal radially facing surface of the ring and engageable with the surface of said enlarged bore portion, positioning means axially positioning said ring in the direction away from said shoulder, and a stationary brake member having an external radially facing surface of revolution frictionally engageable by said internal surface of said ring responsive to flexure of said ring to equalize the torque exerted by said driven member.

7. In a device of the character described, the combination of coaxial rotatable driving and driven members a first of which is provided with an axial bore therethrough and the second of which is provided with an external radially facing surface of revolution rotatively engaged in said bore for relative angular movement of said members, driving means operative between said driving and driven members comprising curved resilient members disposed on opposite sides of said driving and driven members in axial correspondence and each connected at spaced points therealong therewith and said resilient members being oppositely axially engageable with both thereof and being radially flexible responsive to torque therebetween, positioning means axially positioning said resilient members against separation, and stationary brake members having radially facing surfaces of revolution respectively engageable by said resilient members responsive to flexure thereof to equalize the torque exerted by said driven member 8. In a device of the character described, the combination of rotatable coaxial driving and driven members a first of which is provided with an axial bore therethrough and the second of which is provided with an external radially facing surface of revolution rotatively engaged in said bore for relative angular movement of said members, driving means operative between said driving and driven members comprising resilient split rings disposed on opposite sides of said driving and driven members in axial correspondence and each having its ends respectively connected therewith and said rings being oppositely axially engageable with both thereof and being radially flexible responsive to torque therebetween, studs extending across between said rings and through openings through one of said driving and driven members and secured with said rings to maintain the same in axially spaced relation and stationary brake members having radially facing surfaces of revolution respectively engageable by said resilient members responsive to flexure thereof to equalize the torque exerted by said driven member.

9. In a device of the character described, the combination of rotatable coaxial driving and driven members a first of which is provided with a stepped axial bore forming outer large bore portions and a small bore portion therebetween and oppositely facing axial shoulders between said bore portions and said small bore portion being provided with a recess open at the bore thereof and at said shoulders and the second of which members is provided with an external radially facing surface of revolution rotatively engaged in said small bore portion for relative angular movement of said members and provided with a radial projection extending into said recess, driving means operative between said driving and driven members comprising resilient split rings disposed on opposite sides of said driving and driven members and respectively within said large bore portions in axial correspondence with said driving and driven members and oppositely axially engageable with said shoulders and correspondingly engageable with said second member and studs extending across between said rings and through said recess and secured respectively with corresponding ends of said rings and respectively angularly engaging a radial side of said recess and said projection to drivingly connect the ends of said rings respectively with said driving and driven members, said rings being radially flexible responsive to torque between said driving and driven members and increasing in radial thickness from their ends toward the intermediate portions thereof and provided with lugs spaced angularly thereabout and projecting radially outwardly therefrom and having their outer ends equidistant from the internal radially facing surfaces of the rings and engageable with the surfaces of said large bore portions, concentrically bored brake rings disposed on opposite sides of said second member and having their external radially facing surfaces frictionally engageable by said internal surfaces of said resilient rings responsive to flexure of said resilient rings, mounting means on said second member and engaging the bores of said brake rings and carrying the same for rotation with respect thereto, and stationary members connected with said brake rings and holding the same against rotation.

ALBERT S. HOWELL.